United States Patent
Anderson et al.

(10) Patent No.: US 7,090,891 B2
(45) Date of Patent: Aug. 15, 2006

(54) METHOD FOR FABRICATING NANOSTRUCTURED SOLID OXIDE FUEL CELLS AND CELL COMPONENTS

(75) Inventors: Harlan Anderson, Rolla, MO (US); Xiao-Dong Zhou, Rolla, MO (US); Wayne Huebner, Rolla, MO (US)

(73) Assignee: Curators of the University of Missouri, Columbia, MO (US)

( * ) Notice: Subject to any disclaimer, the term of this patent is extended or adjusted under 35 U.S.C. 154(b) by 269 days.

(21) Appl. No.: 10/426,030

(22) Filed: Apr. 28, 2003

(65) Prior Publication Data

US 2006/0141137 A1    Jun. 29, 2006

(51) Int. Cl.
B05D 5/12 (2006.01)
H01M 4/88 (2006.01)

(52) U.S. Cl. .................. 427/115; 427/126.3; 502/101

(58) Field of Classification Search ............. 429/40, 429/41, 44, 45; 427/115, 126.3; 502/101
See application file for complete search history.

(56) References Cited

U.S. PATENT DOCUMENTS

| 5,494,700 | A  | * | 2/1996 | Anderson et al. ........... 427/115 |
| 6,746,791 | B1 | * | 6/2004 | Yadav et al. .................. 429/30 |
| 6,803,138 | B1 | * | 10/2004 | Seabaugh et al. ......... 429/45 X |
| 6,852,436 | B1 | * | 2/2005 | Badding et al. ......... 427/115 X |
| 2003/0215378 | A1 | * | 11/2003 | Zhou et al. ................. 423/263 |
| 2004/0043272 | A1 | * | 3/2004 | Gorte et al. .............. 429/44 X |

* cited by examiner

*Primary Examiner*—Stephen J. Kalafut
(74) *Attorney, Agent, or Firm*—Kenyon & Kenyon LLP

(57) ABSTRACT

A method of fabricating a nanostructured solid oxide fuel cell includes dispersing ceria and doped ceria nanoparticles in a first colloidal solution, atomizing the first colloidal solution into a spray, depositing the spray onto a substrate to form a thin film electrolyte, dispersing a nanocomposite powder including ceria and CuO in the first solution, forming a second colloidal solution, atomizing the second colloidal solution into a second spray, and depositing the second spray over the thin film electrolyte as an interfacial layer.

8 Claims, 2 Drawing Sheets

| | |
|---|---|
| CERIA PARTICLES ARE FORMED | 100 |
| ↓ | |
| DOPED AND/OR UNDOPED CERIA PARTICLES ARE DISPERSED IN SOLVENT | 110 |
| ↓ | |
| COLLOIDAL SOLUTION IS ATOMIZED TO AN AEROSOL | 120 |
| ↓ | |
| AEROSOL IS DEPOSITED AS A THIN FILM LAYER OVER SUBSTRATE | 125 |
| ↓ | |
| A SECOND COLLOIDAL SOLUTION IS CREATED BY MIXING NANOCOMPOSITE PARTICLES OF CERIA AND CuO | 130 |
| ↓ | |
| THE SECOND COLLOIDAL SOLUTION IS ATOMIZED INTO AN AEROSOL | 135 |
| ↓ | |
| THE ATOMIZED AEROSOL IS DEPOSITED OVER THE THIN FILM LAYER AS AN INTERFACIAL LAYER | 140 |
| ↓ | |
| A NANOSTRUCTURED ELECTRODE IS FORMED OVER THE INTERFACIAL LAYER | 150 |

FIG. 1

METHOD FOR FABRICATING NANOSTRUCTURED SOLID OXIDE FUEL CELLS AND CELL COMPONENTS

RELATED APPLICATION

The present invention relates to commonly assigned and co-pending U.S. patent application Ser. No. 10/146,824, entitled "Method for Directly Synthesizing Doped and Undoped Nanometer-scale $CeO_2$ Particles," filed on May 15, 2002, which is incorporated by reference in its entirety herein.

FIELD OF THE INVENTION

The present invention relates to solid oxide fuel cells, and in particular, relates to a method of fabricating nanostructured solid oxide fuel cells and cell components for a solid oxide fuel cell that operates at intermediate temperatures.

BACKGROUND INFORMATION

In an effort to address the cost and reliability issues, over the past few years, the development of Solid Oxide Fuel Cells (SOFCs) has been towards the reduction of operation temperature into the intermediate temperature (IT) regime (500–700° C.). However, for SOFCs to maintain the performance levels in the intermediate temperature that are currently achieved in the high temperature regime (900–1000° C.), stricter demands are placed upon material selection and the techniques applied in fabrication of the fuel cells because the component materials need to enable electrode kinetics and internal resistances similar to those achieved in the high temperature regime. It has proven challenging to process electrolyte and interfacial layers having the requisite density, thickness, and mechanical characteristics to boost the intermediate temperature operation.

SUMMARY OF THE INVENTION

In general, the present invention provides a method of fabricating a solid oxide fuel cell using ceria or doped ceria nanoparticles.

According to one embodiment, the method of the present invention includes dispersing ceria and doped ceria nanoparticles in a first colloidal solution, atomizing the colloidal solution into a spray, depositing the spray onto a substrate to form a thin film interfacial layer having a thickness in the range of 100 nm to 10 µm, forming an anode from a nanocomposite of ceria and CuO at low temperature, coupled to the interfacial layer.

According to another embodiment, the method of the present invention includes dispersing ceria or doped ceria nanoparticles in a first colloidal solution, atomizing the colloidal solution into a spray, depositing the spray onto a substrate to form a thin film electrolyte, dispersing a nanocomposite powder including ceria and CuO in the first solution forming a second colloidal solution, and atomizing the second colloidal solution, which is deposited over the thin film electrolyte as an interfacial layer.

The present invention also provides a process of making a nanocomposite of lanthanide-doped cerium dioxide and copper oxide including mixing a first solution of cerium nitrate, a nitrate of a lanthanide series metal, and copper nitrate, with a second aqueous solution of ammonium hydroxide to form a third solution. The process further comprises controlling the pH of the third solution, precipitating lanthanide-doped cerium dioxide particles and copper oxide particles from the third solution, and forming a composition of lanthanide-doped cerium dioxide and copper oxide by heating the lanthanide-doped cerium dioxide particles and the copper oxide particles at a temperature of about equal to or less than 200° C.

The present invention provides the advantages that a wide range of electrolyte thicknesses may be provided on either dense or porous substrates at room temperature. The fabrication process is easy to scale-up, and the nanostructured components allow a lower fabrication temperature of approximately 800° C., which is about 400 degrees lower than has been previously reported. In addition, the nanocomposites of ceria and CuO can be formed at a relatively low temperature of approximately 200° C. with an average particle size of less than 20 nm, indicating that the segregation of doped ceria and CuO is also under 20 nm. This low segregation distance improves anode performance, which is directly related to particle size.

Another advantage provided by the present invention is that the nanostructured interfacial layer significantly decreases interfacial resistance and the voltage loss in the solid oxide fuel cell as a whole.

BRIEF DESCRIPTION OF THE DRAWINGS

FIG. 1 shows a flow chart of an embodiment of the method of fabricating a solid oxide fuel cell according to the present invention.

DETAILED DESCRIPTION

Figure 2:
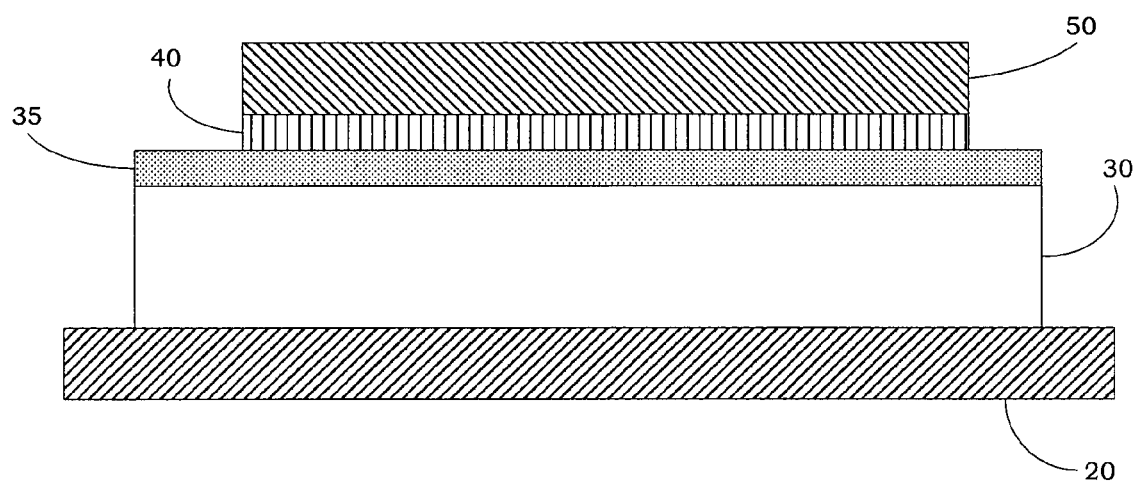
FIG. 2 shows a schematic illustration of a solid oxide fuel cell according to the present invention.

Referring to FIG. 1, in the method according to an embodiment of the present invention, at a first step 100, cerium dioxide (ceria) nanoparticles are formed according to the method more fully described in U.S. patent application Ser. No. 10/146,824, incorporated by reference above. In brief, the ceria nanoparticles are formed by mixing a first solution of a cerium salt with a second solution of an alkali metal or ammonium hydroxide to produce a third, reactant solution. The third reactant solution is agitated to ensure turbulent flow conditions during which time oxygen may be bubbled through the solution. Cerium dioxide nanoparticles are then precipitated from the third solution. Under certain conditions, the precipitated cerium dioxide particles have a predominant particle size within the range of about between 3 and 100 nanometers and an average grain size of about between 50 nanometers and 5 microns. All or a portion of the cerium dioxide particles may be doped with a lanthanide series metal (i.e. Sm, Pr, Gd, Nd, Yb, Eu, and Y).

In step 110, the doped and/or undoped ceria nanoparticles are dispersed in a solvent, such as a polar organic solvent (alcohol, acetone, etc.), water, and mixtures thereof. The solution to which the ceria is dispersed may comprise any organic or aqueous solution, and in particular may comprise an aqeuous solution of isopropanol and water. In a more particular embodiment, the solution may be an aqueous solution of 40% isopropanol and 60% water. The pH of the solution is adjusted to about between 2 and 3 by adding an acid, such as acetic acid, nitric acide or their mixtures. The dispersal of the ceria nanoparticles in this solution results in the formation of a transparent colloidal solution of cerium dioxide nanoparticles after between 2 and 3 days.

Although the mixture of cerium dioxide nanoparticles may be used for various applications well known to those of skill in the art, one application according to the present invention is for the formation of a thin film. In step 120, the transparent mixture of cerium dioxide nanoparticles is atomized using a liquid nebulizer to form an aerosol and this aerosol is deposited onto either a dense or porous substrate step 125. Since the aqueous components of the colloidal solution are volatile at close to room temperature, upon being deposited, a majority of the aqueous components are released, leaving behind a thin film having a controllable thickness in the range of between about 100 nanometers and 10 microns. Further aqueous components can be removed through low temperature heating.

According to one embodiment, the deposited thin film can be used as either a portion of an electrolyte or as an interfacial layer of a solid oxide fuel cell. In a first embodiment, the thin film layer comprises an electrolyte layer, and in step 130, a second colloidal solution is created by mixing nanocomposite particles of ceria and CuO in the first colloidal solution forming a second colloidal solution, which is then atomized (step 135) and deposited (step 140) over the thin film layer. The nanocomposites of lanthanide doped $CeO_2$ and CuO are formed by adding a mixing solution including $Ce(NO_3)_3$, $Ln(NO_3)_3$ (where Ln=Sm, Pr, Gd, Nd, Yb, Eu, and Y), and $Cu(NO_3)_2$ into an ammonium hydroxide aqueous solution. By carefully controlling the pH value, precipitates are formed with a composition of doped $CeO_2$ particles (<10 nm) and $Cu(OH)_2$ (~20 nm), which are then transformed to nanocomposites of doped $CeO_2$ and CuO at 200° C. The nanocomposites may be processed into nanometer scale perovskite powders by the Pechini method, described in U.S. Pat. No. 5,494,700, by carefully annealing the nanocomposite in a reducing atmosphere, such as $N_2$ at 550° C. with a heating rate of 1° C./min. The final nanocomposite particle size can be controlled in the range of 8 nm to 100 nm. The nanometer scale powders can be then dispersed to form transparent colloidal solution with a similar method shown above.

The layer deposited over the thin film layer in step 140 constitutes an interfacial layer between the electrolyte and an electrode. The characteristics of the nanocomposites in the interfacial layer contribute to reducing the resistivity of the layer. In step 150, a nanostructured electrode including nanocomposite materials is formed over the interfacial layer. In particular, a nanostructured anode may include the ceria and CuO composite fabricated as described above. Nanostructured cathodes may also be fabricated from nanocomposites of samarium, strontium and cobalt.

FIG. 2 schematically illustrates a solid oxide fuel cell fabricated according to the method of the present invention. As shown, the solid oxide fuel cell 10 includes a cathode layer 20, which supports an electrolyte substrate 30. The cathode may comprise a composite and may include an oxide of samarium, strontium, cobalt, and/or iron. The electrolyte substrate 30 may be nanostructured as a composite and may comprise any suitable material(s) known to one of skill in the art, such as yttria-stabilized zirconia (YSZ), and oxide of zirconium and/or yttria. Alternatively, electrolyte substrate 30 may comprise a composite of cerium gadolinium oxide (CGO) and an oxide of cerium and/or gadolinium. According to the embodiment depicted, a thin film electrolyte 35 is deposited from a colloidal solution as described above and includes ceria nanoparticles ranging in size from 4 nm to 100 nm. Over the thin film electrolyte, an interfacial layer 40 is formed between the thin film electrolyte and the anode 50. The interfacial layer is formed from colloidal solution as described above and includes nanocomposite particles of ceria and CuO. The nanostructured anode 50 may comprise CuO and NiO based materials and, in particular, may comprise a composite of ceria and CuO as described above, having an average particle size of less than 20 nm.

What is claimed is:

1. A method of fabricating a solid oxide fuel cell comprising:
   dispersing ceria and doped ceria nanoparticles in a first colloidal solution; atomizing the first colloidal solution into a spray;
   depositing the spray onto a substrate to form a thin film interfacial layer having a thickness in the range of 100 nm to 10 microns; and
   forming an anode from a nanocomposite of ceria and CuO at low temperature over the interfacial layer.

2. The method of claim 1, wherein the thin film interfacial layer is deposited at room temperature.

3. The method of claim 1, further comprising:
   before atomizing the colloidal solution, adjusting a pH of the first colloidal solution to between approximately 2 and 3.

4. A method of fabricating a solid oxide fuel cell comprising:
   dispersing ceria and doped ceria nanoparticles in a first colloidal solution; atomizing the first colloidal solution into a spray;
   depositing the spray onto a substrate to form a thin film electrolyte;
   dispersing a nanocomposite powder including ceria and CuO in the first solution, forming a second colloidal solution;
   atomizing the second colloidal solution into a second spray; and
   depositing the second spray over the thin film electrolyte as an interfacial layer.

5. The method of claim 4, wherein the step of depositing the spray onto a substrate to form a thin film electrolyte takes place at room temperature.

6. The method of claim 5, further comprising:
   before atomizing the first colloidal solution, adjusting a pH of the first colloidal solution to between approximately 2 and 3.

7. A method of making a nanocomposite of lanthanide-doped cerium dioxide and copper oxide comprising:
   mixing a first solution of cerium nitrate, a nitrate of a lanthanide series metal, and copper nitrate, with a second aqueous solution of ammonium hydroxide to form a third solution;
   controlling the pH of the third solution;
   precipitating lanthanide-doped cerium dioxide particles and copper oxide particles from the third solution; and
   forming a nanocomposite of the lanthanide-doped cerium dioxide and the copper oxide by heating the lanthanide-doped cerium dioxide particles and the copper oxide particles at a temperature of about equal to or less than 200° C.

8. The method of claim 7, wherein an average particle size of the nanocomposite is less than 20 nm.

* * * * *